US006605784B2

(12) United States Patent
Eigenmann et al.

(10) Patent No.: US 6,605,784 B2
(45) Date of Patent: Aug. 12, 2003

(54) DISPLAY UNIT FOR A MEASURING INSTRUMENT

(75) Inventors: Marc Eigenmann, Uster (CH); Siegfried Gluvakov, Bubikon (CH); Reto Nüesch, Greifensee (CH)

(73) Assignee: Mettler-Toledo GmbH, Greifensee (CH)

( * ) Notice: Subject to any disclaimer, the term of this patent is extended or adjusted under 35 U.S.C. 154(b) by 0 days.

(21) Appl. No.: 09/967,213

(22) Filed: Sep. 27, 2001

(65) Prior Publication Data

US 2002/0020569 A1 Feb. 21, 2002

Related U.S. Application Data

(63) Continuation of application No. PCT/IB00/00356, filed on Mar. 27, 2000.

(30) Foreign Application Priority Data

Mar. 31, 1999 (DE) .......................... 199 14 806

(51) Int. Cl.[7] .................. G01G 19/22; G01G 23/30
(52) U.S. Cl. ............. 177/25.13; 177/177; 345/35; 345/55; 340/666; 340/815.53; 705/416; 702/1; 702/127; 702/173
(58) Field of Search ............. 177/25.11, 25.12, 177/25.13, 177; 340/815.53, 500, 665, 666; 345/55, 87, 173, 35; 705/416; 708/160; 702/1, 127, 173

(56) References Cited

U.S. PATENT DOCUMENTS

| 4,076,088 A | | 2/1978 | Gallo et al. ............. 177/210 R |
| 4,542,799 A | * | 9/1985 | Komoto ...................... 177/177 |
| 4,607,524 A | * | 8/1986 | Gringarten .................... 73/152 |
| 4,650,014 A | * | 3/1987 | Oldendoef et al. ......... 177/177 |
| 4,788,539 A | * | 11/1988 | Frey ............................. 340/753 |
| 4,992,929 A | * | 2/1991 | Yamada et al. ................ 345/35 |
| 5,083,638 A | | 1/1992 | Schneider ................. 177/25.15 |
| 5,084,832 A | * | 1/1992 | Yamada et al. ........... 177/25.18 |
| 5,112,319 A | * | 5/1992 | Lai ................................ 177/45 |
| 5,757,357 A | * | 5/1998 | Grande et al. .............. 345/134 |
| 6,031,547 A | * | 2/2000 | Kennedy .................... 345/440 |
| 6,342,877 B1 | * | 1/2002 | Nikom ........................ 354/157 |

FOREIGN PATENT DOCUMENTS

| DE | 3419218 | 12/1984 |
| DE | 3340421 | 5/1985 |
| DE | 3511128 | 11/1985 |
| DE | 3540749 | 6/1986 |
| DE | 3913162 | 11/1989 |
| DE | 4226645 | 2/1994 |
| EP | 0092915 | 11/1983 |
| EP | 0128296 | 12/1984 |

OTHER PUBLICATIONS

Patent Abstracts of Japan, vol. 009, No. 040 (P–336), Feb. 20, 1985 & JP 59 182320 A (Shimazu Seisakusho KK), Oct. 17, 1984.

* cited by examiner

*Primary Examiner*—Randy Gibson
(74) *Attorney, Agent, or Firm*—Friedrich Kueffner

(57) ABSTRACT

A display unit for a measuring instrument, particularly for a weighing balance (1), has at least one line-shaped pointer element (25, 27) presented as an image on a display screen composed of individually controllable image dots. The image dots are aligned in the customary dot-matrix arrangement along two grid axes. The display controller is programmed so that the line-shaped pointer element, as it sweeps through its display range, maintains a constant slope angle in relation to the grid axes.

15 Claims, 3 Drawing Sheets

DISPLAY UNIT FOR A MEASURING INSTRUMENT

This is a continuation of Application No. PCT/IB00/00356, filed Mar. 27, 2000.

BACKGROUND OF THE INVENTION

The present invention relates to a display unit for a measuring instrument with a display screen that has dot-sized, individually controllable image elements, commonly referred to as pixels.

Display units of this kind are used in a great variety of measuring instruments which, in particular, includes balances. With the individually controllable pixels, it is possible to represent symbols such as alphabetical and numerical characters of almost any shape and size, as well as pictorial symbols, graphs, etc., in the most diverse and dynamically changing arrangements.

A primary application for the display unit is to represent values of measured quantities in real time. A correct and clearly legible representation is particularly essential in a case where the operator has to take some kind of action based on the value of the measured quantity, such as controlling a speed, setting the magnitude of a current, or weighing a prescribed quantity of a substance. It is possible to use a digital display format for the measured quantity, but it is difficult to follow the progress of the measurement from the constantly changing digits. Also known are displays with graphic pointer elements, such as arrows, lines or the like, that sweep along a graduated scale to indicate the measured or weighed quantity. The latter concept is generally more suitable to inform the operator at a glance about the status of the measurement.

An arrangement of graphic pointer elements of this kind for a coarse and fine indication, respectively, is shown in the European patent application EP-A 0 128 296, where each of the pointer elements moves in a circle, comparable to the hands of a clock. This kind of display can be realized without moving parts, e.g., by optically projecting the pointer elements onto an image screen. However, the optical projection can have the undesirable effect of generating heat, which could be detrimental to the accuracy of the measurement. On the other hand, if a display screen is used in which individually controllable pixels are arranged in two axial directions of a grid, the heat problem can be brought under control, but a line-shaped pointer element that sweeps in a circle like a clock hand has to be formed as a dynamically changing image through a varying sequence and combination of pixel dots. In a moving state, the image gives an irritatingly uneven and jumpy impression to the viewer, which can easily lead to operator fatigue.

OBJECT OF THE INVENTION

It is therefore the object of the present invention, to control a measuring instrument display composed of pixel dots in such a manner that an uneven and jumpy image is avoided.

SUMMARY OF THE INVENTION

The present invention offers a solution to the problem described above by providing a display unit for a measuring instrument, and more particularly for a balance, with an image screen that displays arbitrary symbols composed of individual image dots, i.e., a so-called dot-matrix screen. The image screen has an array of pixel elements in the size of the image dots, which are individually controllable by means of a control device and are aligned in the directions of the grid axes of the dot matrix. The control device (consisting of an arithmetic unit, a memory unit, and a display driver unit) controls a pointer element designed to give the appearance of moving within a display field. The inventive display unit is distinguished in that the pointer element maintains a constant slope angle ($\beta$) as it sweeps over the display field. The basic concept of the invention is to use only pointer elements that maintain an invariant slope angle in relation to an axis of the pixel grid. The apparent sweep effect is created through a translatory movement in which the pointer element remains parallel to itself.

In one of the preferred embodiments of the invention, the pointer element consists of two segments. A first segment extends in the direction of one of the grid axes. The segments are composed of individual bar elements that are aligned parallel to the other grid axis. The bar elements are staggered at a different pitch in the first segment compared to the second segment, so that the two segments meet at a corner or break point. The position of the pointer element is varied by moving the break point along the direction of the first segment and adjusting the length of the latter, while at the same time moving the second segment parallel to itself in the direction in which the bar elements are aligned and adjusting the length of the second segment.

In another preferred embodiment of the invention, the pointer element is constituted of two different lines or rows composed of image dots. A first row of image dots is oriented in the direction of one of the grid axes and movable in the direction of the other grid axis, while a second row of image dots is oriented in the direction of the latter ("other") axis and movable in the direction of the former grid axis.

In many measurement processes, the end result has to match a prescribed target value. In this case, it is advantageous if the display not only indicates the momentary result of the measurement, but also the amount remaining to reach the target, where the remaining amount is shown with a higher degree of sensitivity, if possible, i.e., in a so-called fine-indication display. The problem to be solved by the invention occurs specifically in the display indication of a balance on which a material sample of a prescribed weight is to be prepared. Up to a point closely before the target weight, the material can be dispensed onto the balance relatively quickly (and the weight indication in this phase can be relatively coarse), but the last remaining amount has to be added very carefully while closely observing the progress of a sharply defined indication. In principle, the problems are analogous for every control process in which a measured quantity has to be matched to a target. A coarse and fine display for this kind of process can also be realized with the display unit according to the invention by using an arrangement where the coarse indication is represented by a part of the pointer element that moves in one axial direction of the pixel grid, while the fine indication is represented by a part of the pointer element that moves in the other axial direction of the pixel grid.

Preferably, in the coarse-/fine-indicating display according to the invention, the first and second grid axes of the dot matrix are substantially perpendicular to each other. In particular, the grid axes are oriented in the transverse or horizontal direction and in the up/down or vertical direction of the display field.

In the aforementioned embodiment where the pointer element has two segments connected at a break point, it is preferred if the sweep of the second segment of pointer element serves to provide the fine weight indication. The coarse indication is realized by setting the break point at a stationary position corresponding to a minimal length of the first segment and by activating a weight-dependent portion of the bar elements of the second segment.

As an alternative to the foregoing concept, the coarse indication may be realized (with the break point set again at a stationary position corresponding to a minimal length of the first segment) by successively activating a weight-dependent number of bars that are arranged above one another, each of them filling the space between one of the bar elements of the second segment of the pointer and the nearest border of the display field.

Expanding further on the same concept, during the phase of coarse weight indication, a mirror-symmetric stack of bars could be successively activated on the other side of the display field adjacent to the opposite border.

BRIEF DESCRIPTION OF THE DRAWING

Further details of the invention may be learned from the following description of embodiments that are illustrated in the drawings, wherein.

DETAILED DESCRIPTION OF PREFERRED EMBODIMENTS

Figure 1:
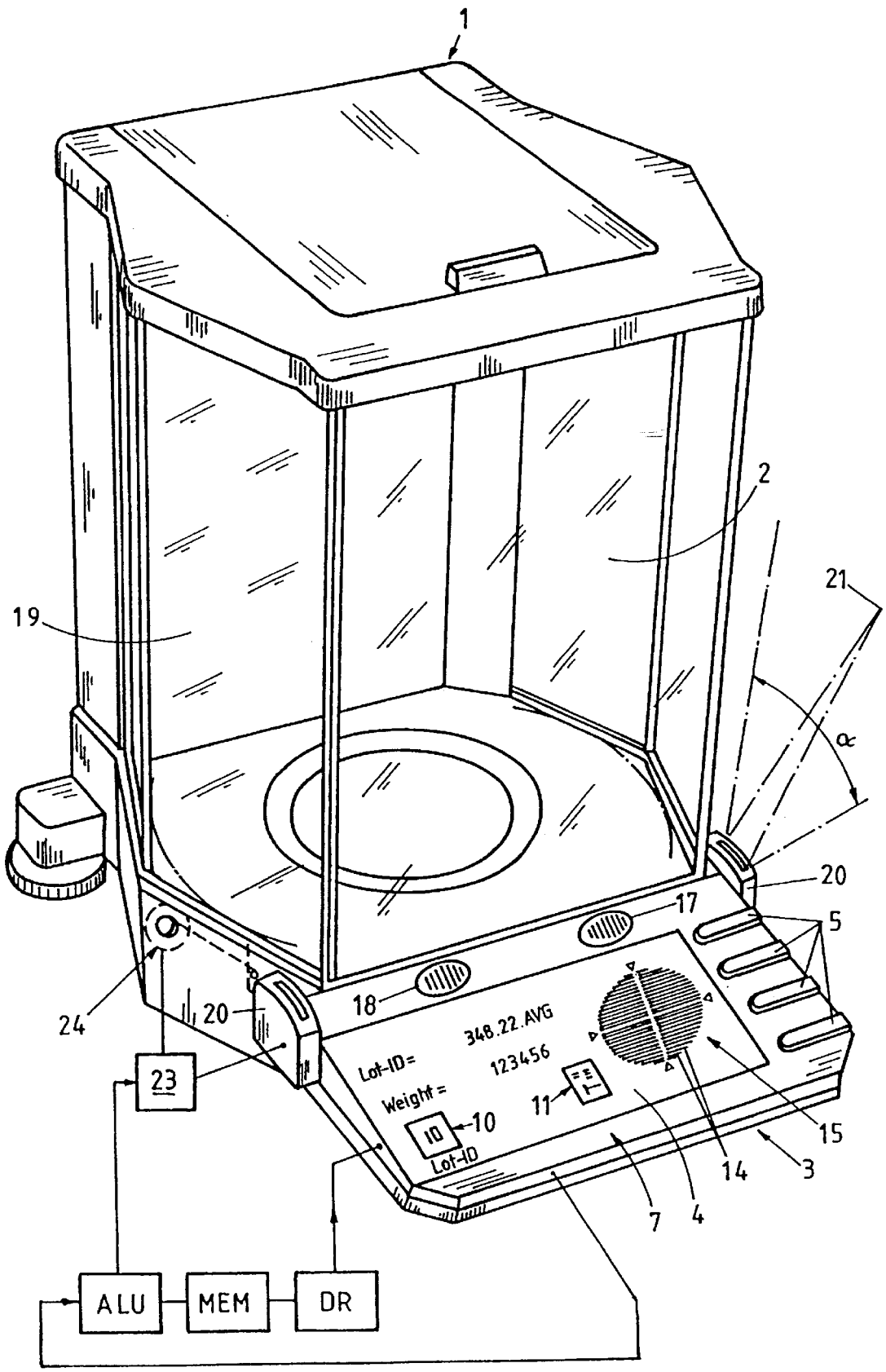
FIG. 1 represents a perspective view of a balance that is equipped according to the invention.

FIG. 1 illustrates a laboratory balance 1 with a draft shield 2 that is equipped with a front-mounted operator console 3 including an image display screen 4 that is part of an input device 7 with input keys 5. The display screen 4 is composed of individual pixels 6 forming the elements of the display. The pixels may be seen most clearly in a slanted line as indicated in the image element in FIG. 2, where the image dots are identified by the reference symbol 6. They are distributed over the entire screen in a uniform grid, particularly in the form of an LCD matrix. Different display symbols are represented as combinations of pixel dots. A screen 4 can be formed, for example, by a matrix of 240×320 pixels 6.

In the customary manner, an image display screen 4 is controlled by a display controller/driver DR that may be equipped, e.g., with at least one shift register. The controller/driver receives its information from a memory module MEM triggered by a command from a processor or arithmetic unit ALU. The memory module MEM essentially contains the displayable symbols and their placement locations on the screen 4.

If the image screen 4 is designed as a so-called touch screen, it can at the same time serve as a part of the input device 7, i.e., it can detect when a specific area of the screen is being touched and interpret the touch signal as an input command analogous to pushing a key. The entry area of the touch screen can be subdivided under software control and can be variably configured to correspond to the display image. The framed fields 10 and 11 in FIG. 1 represent examples of touch fields, each being assigned a specific input command function.

Figure 2:
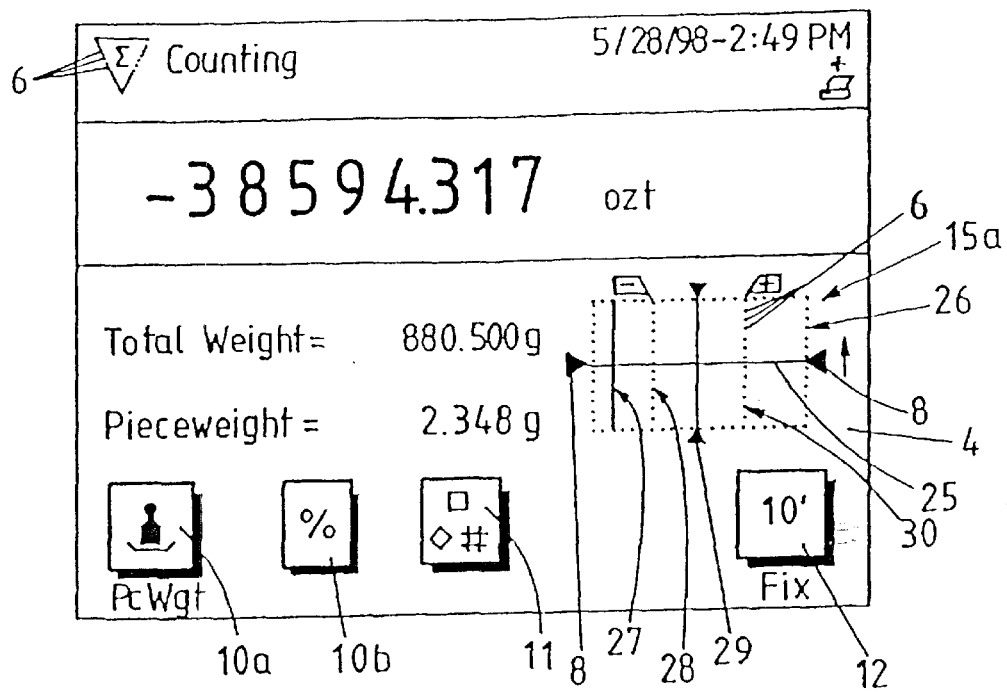
FIGS. 2 and 3 illustrate variations of the screen image that may be used in the balance of FIG. 1 with a display unit according to the invention.

Another four input areas of this kind are shown as fields 10a, 10b, 11 and 12 in the bottom part of the touch screen 4 in FIG. 2. In all other aspects, FIG. 2 represents a typical balance display of the known kind that can be realized with a dot-matrix screen and does not need to be explained further. The displayed symbols and graphical images in the screen 4 are composed of pixels that are arranged in the directions of the horizontal and vertical axes of the screen raster.

A field 15a delimited by a dotted rectangular frame 26 is shown in the middle of the right half of the display 4 in FIG. 2. A pointer element consisting of a horizontal pixel row 25 and a vertical pixel row 27 serves to represent the weighing result. The latter can be represented in the form of a coarse/fine display as follows: A first index bar 25 consisting of a horizontal row of dots serves as coarse indicator, moving continuously upwards as material is being added until the first index bar 25 has reached the marks 8 that are located outside of the rectangle 26. This condition could signify, e.g., that 98% of the targeted amount have been dispensed. At this point, the pouring needs to be slowed down in order to avoid overshooting the target. The remaining 2% of the target weight are now added slowly. This relatively small part of the range is spread over the horizontal width of the rectangle 26, where a vertical index bar 27 consisting of a vertical row of dots now moves from left to right. A dotted vertical line 28 marks the lower tolerance limit, and a further dotted vertical line 30 marks the upper tolerance limit. The vertical line 28 can also mark the transition to a range where the display sensitivity is increased a second time.

The visual display through a movable image as described above can be complemented by an acoustical indication. As soon as the vertical index bar passes through the line 28 near the center mark 29, the loudspeaker 18 (FIG. 1) can sound an acoustical signal. The latter could, e.g., increase in amplitude (loudness) and/or frequency (pitch) until the center mark 29 is reached, but it could also remain the same. As a practical feature, the acoustical signal either changes or stops abruptly when the center mark 29 has been reached, so that the operator is continuously informed about the progress towards the target weight without being distracted from concentrating on the dispensing process. When the vertical index bar 27 has passed the center mark 29, there could be another acoustical signal if desired. An overfill above the center mark 29 would still be within tolerance up to the point where the index bar 27 passes the line 30.

It goes without saying that one could also use the reverse arrangement for coarse and fine indication, i.e., the vertical bar could be used as coarse indicator, and the horizontal bar as fine indicator. However, this may generally not be desirable, particularly in the case of a rectangular indicator field like the field 15a, because it is preferable to use the longer side of the rectangular field for the fine indication. It is also conceivable to use lines that are slanted at a constant angle in relation to the horizontal or vertical grid axis, but horizontal and vertical bars appear to have the advantage of giving a clearer visual perception.

The tolerance limits 28, 30 could stay at a fixed distance from each other, because the index bar of the fine indication does not necessarily have to always move in proportion to the speed of the weight change, but could also move either slower or faster to compensate for different settings of the desired or preset tolerance limits. It is also possible to use a concept where only the target weight has to be entered, in which case the arithmetic unit would use a preprogrammed percentage to calculate the positions of the lines 28, 30 in relation to the center mark 29 and to set their screen images as lines 28, 30 of individual, spaced-apart pixels. This simplifies the entry process for the operator, because the specific tolerance limits 28, 30 do not have to be entered separately. A person skilled in the art will be able to readily implement other possibilities of setting the limits and using them together with the coarse and fine indications in accordance with the measurement to be performed.

According to the foregoing discussion, the dual representation is suitable for displaying the amount of the remaining weighing range (between the horizontal index bar and the demarcation line above it, and between the vertical index bar and the demarcation line to the right of it) as well as the current state of a filling process in a coarse and fine format. Moreover, the display image also shows the tolerance limits in a simple representation that is understood by any operator regardless of language. If desired, it is possible to switch over to a different display format, e.g., by means of a touch control such as the touch field 11 shown in FIG. 2.

Figure 3:
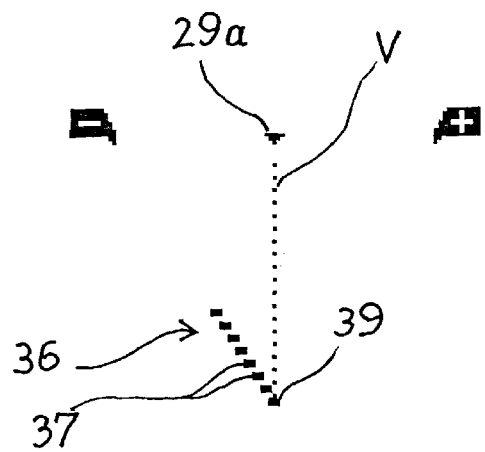
Figure 3:
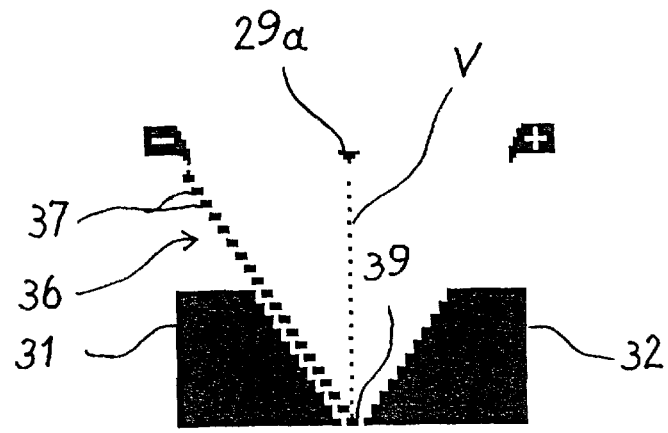
Figure 3:
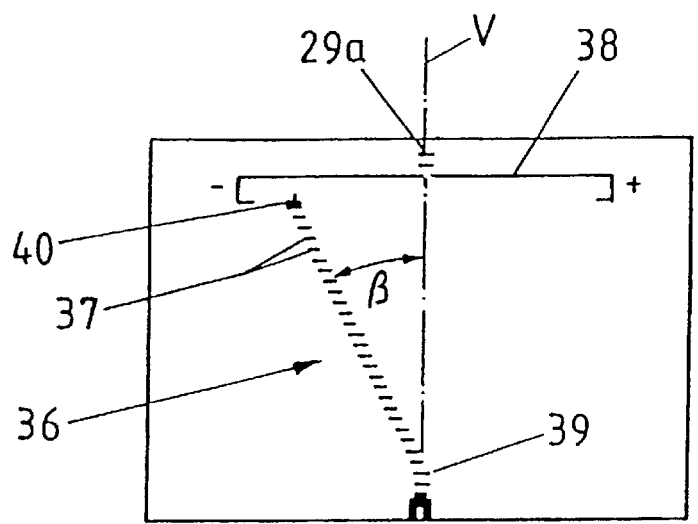
Figure 3:
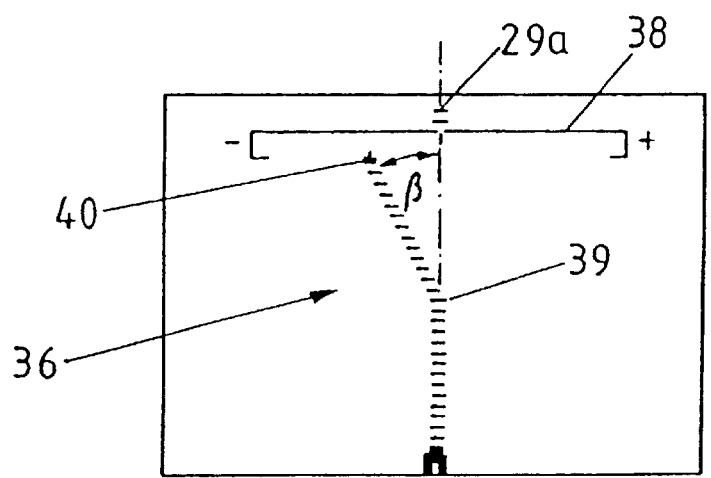
Figure 3:
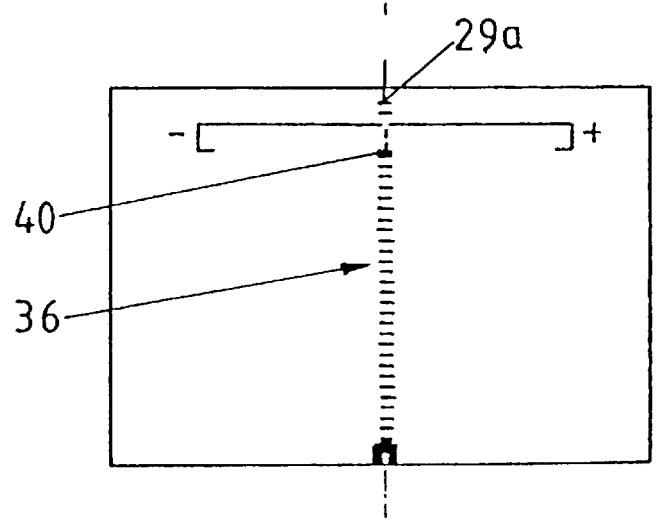

Another possible format of an indicator, particularly a fine-range indicator, is illustrated in a time sequence in FIGS. 3a) to 3c), and in an exemplary position for two related embodiments in FIGS. 3d) and 3e). As mentioned above, a line with a dynamically changing slope angle appears irritatingly uneven and jumpy on a dot-matrix screen. In contrast, a static image of a slanted line causes no irritation, particularly if it is composed of pixels that are evenly staggered by one grid interval. However, it is characteristic of an LCD dot matrix that there are only certain angles that produce an image of evenly staggered pixels. Lines that are inclined at other angles in relation to the matrix grid will have a jagged appearance. FIG. 3 illustrates how it is nevertheless possible to compose an image of an arrow-shaped index pointer from individual bar elements 37. The bar elements 37 are staggered in relation to each other by one grid interval so that, together, they form the image of an index pointer 36 slanted at an angle β in relation to the vertical grid axis V. A horizontal line 38 at the top is also configured as a bar element, thus entirely straight, in contrast to the arc-shaped indicator scales that are used with conventional pointers that swivel about a center point. End markings on the line 38 indicate minus and plus tolerances, respectively. The coarse indication could be realized in one of the ways discussed above, or it could be represented by making the individual bars 37 of the pointer 36 appear one after another as the measuring quantity increases (FIG. 3d)), so that no separate indicator field is required for the coarse indication while the indicator format is still graphically clear and expressive, independent of language. In a practically proven display, the pointer 36 is already visible in its leftmost extreme position at the beginning of the weighing process, and the coarse indication is represented by the successive appearance of horizontal bars 31, 32 arranged above one another and extending from the left border of the display field to the pointer 36 (FIG. 3e)). It is advantageous, if a symmetrical image is presented on the right side of the display. As the point is reached in the weighing process where the display changes to the fine-resolution mode, the pointer 36 begins to perform an apparent sweeping motion as shown in FIGS. 3a) to 3c). If the weight value increases beyond the upper tolerance limit of the fine-resolution range and the pointer element 36 therefore moves past the symmetrical arrangement of bars on the right side of the display, the bars are made to disappear again one after another as the weight increases further.

As illustrated in FIGS. 3a) and 3b), as the weight added to the balance pan increases towards the set target, it is not the angle β that changes. Rather, the break point 39 of the pointer 36 (i.e., the apparent swivel fulcrum of the pointer) moves upwards towards the "dial scale", i.e., the horizontal line 38. However, the visual effect is the same as if the index pointer 36 were swiveling; its upper segment moves parallel to itself in the direction of the horizontal axis of the dot-matrix and thereby becomes progressively shorter as the upper end of the pointer 36 moves along the line 38. This process continues until the break point 39 disappears and the head 40 of the pointer 36 is exactly at the center mark 29a which is likewise made up of bar elements, as illustrated in FIG. 3c). If the target weight has been overshot, the index pointer will break to the right, analogous to the way in which it breaks to the left in FIG. 3b).

It is considered self-evident that within the scope and principal concepts of the invention, numerous embodiments of displays are possible, and also that some of the illustrated display elements can be combined with each other. In any case, the simplified graphic representation on a dot matrix display screen ensures a good visual perception even under conditions of stress and difficult language communication. Furthermore, the simplified function of the input device allows the operator to concentrate more on the activities of performing the measurement. It is considered self-evident that the format of the graphic representation has to be programmed in the memory module MEM (FIG. 1) and executed on the display screen through the driver stage DR.

What is claimed is:

1. A display unit for a measuring instrument with an image screen (4) to display arbitrary symbols composed of individual image dots (6), said image screen comprising pixel elements in the size of the image dots, said pixels elements being individually controllable by means of a control device (ALU, MEM, DR) and being arranged in the directions of a first dot-matrix axis and a second dot-matrix axis (V), wherein the control device (ALU), MEN, DR) individually controls said pixel elements such that a linearly shaped pointer element (25, 27; 36) is formed that gives the appearance of a line moving within the display and wherein the control device (ALU, MEM, DR) causes said pointer element to move slantedly across said image screen (4) based on a measuring value such that the pointer element maintains a constant slope angle (β) in relation to the second dot-matrix axis (V).

2. The display unit of claim 1, wherein the measuring instrument is a balance (1).

3. The display unit of claim 1, wherein the pointer element (36) comprises a first segment and a second segment, the first segment extending in the direction of the second dot-matrix axis (V), said segments being composed of individual bar elements (37) and said bar elements being oriented parallel to the first dot-matrix axis and staggered at a different pitch in the first segment compared to the second segment, said segments meeting at a break point (39), and wherein further the pointer element (36) is changed by moving the break point (39) along the second dot-matrix axis (V) and adjusting the length of the first segment, while at the same time moving the second segment in the direction of the first dot-matrix axis in a parallel motion and adjusting the length of the second segment.

4. The display unit according to claim 1, wherein the pointer element is constituted by a first row of image dots (25) oriented in the direction of the first dot-matrix axis and movable in the direction of the second dot-matrix axis (V), and a second row of image dots (27) oriented in the direction of the second dot-matrix axis (V) and movable in the direction of the first dot-matrix axis.

5. The display unit of claim 1, wherein the display unit is adapted for a balance and said display unit provides a coarse weight indication for a first weighing range below a targeted weight value and a fine weight indication for a second weighing range close to the targeted weight value, wherein further the coarse and fine weight indications can be displayed overlapping each other within a single display field, and wherein within said single display field the coarse weight indication is realized by means of a first pointer element part that is movable in the direction of one of said dot-matrix axes and the fine weight indication is realized by means of a second pointer element part that is movable in the direction of the other of said dot-matrix axes.

6. The display unit of claim 1, wherein the first dot-matrix axis and the second dot-matrix axis (V) are substantially perpendicular to each other.

7. The display unit of claim 6, wherein the second dot-matrix axis (V) is oriented vertically.

8. The display unit of claim 3, wherein the display unit is adapted for a balance and said display unit provides a coarse weight indication for a first weighing range below a targeted weight value and a fine weight indication for a second weighing range close to the targeted weight value, wherein further the change of the pointer element (36) serves to provide the fine weight indication, while the coarse weight indication is realized by setting the break point (39) at a stationary position corresponding to a minimal length of the first segment and by activating a weight-dependent portion of the bar elements (37) of the second segment.

9. The display unit of claim 3, wherein the display unit is adapted for a balance and said display unit provides a coarse weight indication for a first weighing range below a targeted weight value and a fine weight indication for a second weighing range close to the targeted weight value, wherein further the change of the pointer element (36) serves to provide the fine weight indication, while the coarse weight indication is realized by setting the break point (39) at a stationary position corresponding to a minimal length of the first segment and by successively activating a weight-dependent number of first bars (31) that are arranged above one another, each first bar extending between one of the bar elements (37) and a first display-field border closer to said one of the bar elements (37).

10. The display unit of claim 9, wherein the coarse weight indication is further realized by activating a second bar (32) together with each first bar, said second bar being mirror-symmetric to said first bar in relation to the dot-matrix axis (V).

11. The display unit of claim 5, wherein the display field (15a) is adapted to further display at least one line-shaped image element (28, 30) to mark at least one value from a group that consists of a target value, limit values and tolerance values.

12. The display unit of claim 11, wherein the display unit comprises means (10, 10a, 10b) for entering said at least one value, and wherein the control device (ALU, MEM, DR) comprises an arithmetic device (ALU) to convert the at least one value into a display control value that serves to position said at least one demarcation line.

13. The display unit of claim 12, wherein the display unit further comprises an acoustical indicator (18) and the control device (ALU, MEM, DR) triggers an acoustical signal when a measured weight value enters a certain weighing range, the acoustical indicator (18) being designed to emit at least two different signals distinguished by at least one of the sound qualities of loudness and pitch.

14. The display unit of claim 13, wherein the acoustical indicator (18) is designed to emit a first signal when one of the limit values has been reached and to emit a second signal when the target value has been reached.

15. A display unit for a balance with an image screen (4) to display arbitrary symbols comprised of individual image dots (6), said image screen comprising pixel elements in the size of the image dots, said pixels elements being individually controllable by means of a control device (ALU, MEM, DR) and being arranged in the direction of a first dot-matrix axis and a second dot-matrix axis (V), wherein the control device (ALU, MEN, DR) individually controls said pixel elements based on a measured weight such that a linear pointer element (25, 27; 36) is formed that gives the appearance of a line moving within the display and wherein the control device (ALU, MEM, DR) causes said pointer element (25, 27; 36) to move at a slant across said image screen (4) such that the pointer element maintains a constant slope angle ($\beta$) relative to the second dot-matrix axis (V) and indicates relative to a reference scale a change in the measured weight.

* * * * *